United States Patent
Vogel et al.

[11] Patent Number: 5,701,193
[45] Date of Patent: Dec. 23, 1997

[54] OPTICAL REFLECTION MODULATOR

[75] Inventors: Paul Vogel, Steffisburg; Olivier Anthamatten, Fribourg; Rainer Bättig, Bern, all of Switzerland

[73] Assignee: Ascom Tech AG, Bern, Switzerland

[21] Appl. No.: 604,433

[22] Filed: Feb. 21, 1996

[30] Foreign Application Priority Data

Feb. 21, 1995 [CH] Switzerland .................. 00 498/95

[51] Int. Cl.[6] .................................................. G02B 26/00
[52] U.S. Cl. .......................... 359/290; 385/49; 385/52
[58] Field of Search ........................ 359/290, 291, 359/293, 578, 7, 15; 385/14, 25, 49, 52, 130; 356/352

[56] References Cited

U.S. PATENT DOCUMENTS

| | | | |
|---|---|---|---|
| 4,978,188 | 12/1990 | Kawachi et al. | 385/14 |
| 5,065,011 | 11/1991 | Fujihara et al. | 385/49 |
| 5,212,745 | 5/1993 | Miller | 385/25 |
| 5,212,746 | 5/1993 | Miller et al. | 385/25 |

*Primary Examiner*—Loha Ben
*Attorney, Agent, or Firm*—Burns, Doane, Swecker & Mathis, LLP

[57] ABSTRACT

The reflection modulator (11), serving the purpose of modulating a light beam emerging from an optical fiber (42) and re-entering the same, is essentially based on a microstructural Fabry and Perot interferometer. The interferometer is formed by two parallel reflecting layers (18, 20) which are electrically conductive, electrically insulated from each other, and connected to electric terminals (28, 30), and an air gap (19) which is comprised between them. A mechanical excursion of one (20) of the two reflecting layers can thus be produced by an electric wanted signal (NS). The reflecting layers (18, 20) are disposed on a base block (14) of monocrystalline silicon having two parallel main surfaces (15, 16) each of which is covered by two passivating coatings (25, 35, 26, 36). The base block (14) is provided with a recess on one (16) of the main surfaces. An optical fiber (42) is fastened in said recess by means of an adhesive (44) in such a manner that the fiber end is completely enclosed by said adhesive. Thereby and by the structure of the associated coatings (26, 36), a minimal reflection is obtained. On the other main surface (15), the combination of the corresponding coatings (25, 35) and of the fixed reflecting layer (18) result in semipermeability to the light beam emerging from the optical fiber (42) and passing through the base block (14). After its modulation in the Fabry and Perot interferometer, the light beam returns to the optical fiber (42) in the reverse direction. (FIG. 1).

20 Claims, 4 Drawing Sheets

OPTICAL REFLECTION MODULATOR

BACKGROUND OF THE INVENTION

The invention refers to a reflection modulator for a light beam emerging from an optical fiber and re-entering the same, comprising a modulator unit which is based upon a Fabry and Perot interferometer and one of whose two parallel reflecting layers is mechanically displaceable by a wanted electric signal, and a mechanical mounting which joins the optical fiber and the modulator unit. The invention further refers to a method for the manufacture of such a modulator.

Modulators for light beams emerging from optical fibers are known. In case of returning the beam to the fiber during or after the modulation of the light, then the process is called reflection modulation.

DE 40 31 970 to Standard Elektrik Lorenz discloses a reflection modulator which is based on the properties of a Fabry and Perot resonator. This modulator is provided with a movable mirror whose orientation is perpendicular to the optical fiber from which the subsequently modulated light beam emerges. The front surface of the fiber constitutes the second mirror of the Fabry and Perot system. A standing wave can form between the two mirrors, an actual resonance only occurring if the distance between the two mirrors corresponds to an integral multiple of half the wavelength of the light beam. In all other cases where this condition is not fulfilled, the resonator is more or less out of tune. Due to this property, a greater or lesser proportion of the emerging light beam can be reflected back to the optical fiber in function of the position of the movable mirror. This means that the returned light beam is capable of being modulated according to the excursion of the movable mirror. The excursion itself may be obtained by any desired electromechanical means, e.g. by means of an electrically controlled, quartz-based flexural or thickness resonator.

EP 599 375 discloses another reflection modulator wherein two membranes which are extended in the same plane are mutually displaceable by electromechanical means. These membranes, manufactured according to the silicon etching technique, each reflect approximately half of an orthogonally impinging light beam emerging from a fiber back to said fiber. When the two partial beams recombine, they amplify or attenuate each other according to the excursion of the membranes, due to interference. The excursion of the membranes is obtained by applying an electric voltage to at least one of the membranes and a counter-electrode disposed in parallel to the membranes.

The reaction of the second one of the mentioned light modulation types to exterior influences such as temperature variations is less critical than that of the first one since essentially only the relative displacements between the two membranes of the same kind are involved but not the absolute length as is the case in a Fabry and Perot resonator.

SUMMARY OF THE INVENTION

It is the object of the invention to provide another reflection modulator on the base of the mentioned prior art. Its technical design shall be such that it is not only functional under laboratory conditions but also suitable for rough everyday use.

This object is attained by a reflection modulator wherein a base block is provided having two main surfaces, and wherein a first one of said reflecting layers is stationary on one of said main surfaces and the second one of said reflecting layers is separated by an air gap and essentially parallel to the first one. The dependent claims define preferred embodiments of the invention.

BRIEF DESCRIPTION OF THE DRAWINGS

The invention is explained in more detail hereinafter by way of examples and with reference to five figures.

DETAILED DESCRIPTION OF THE INVENTION

Figure 1:
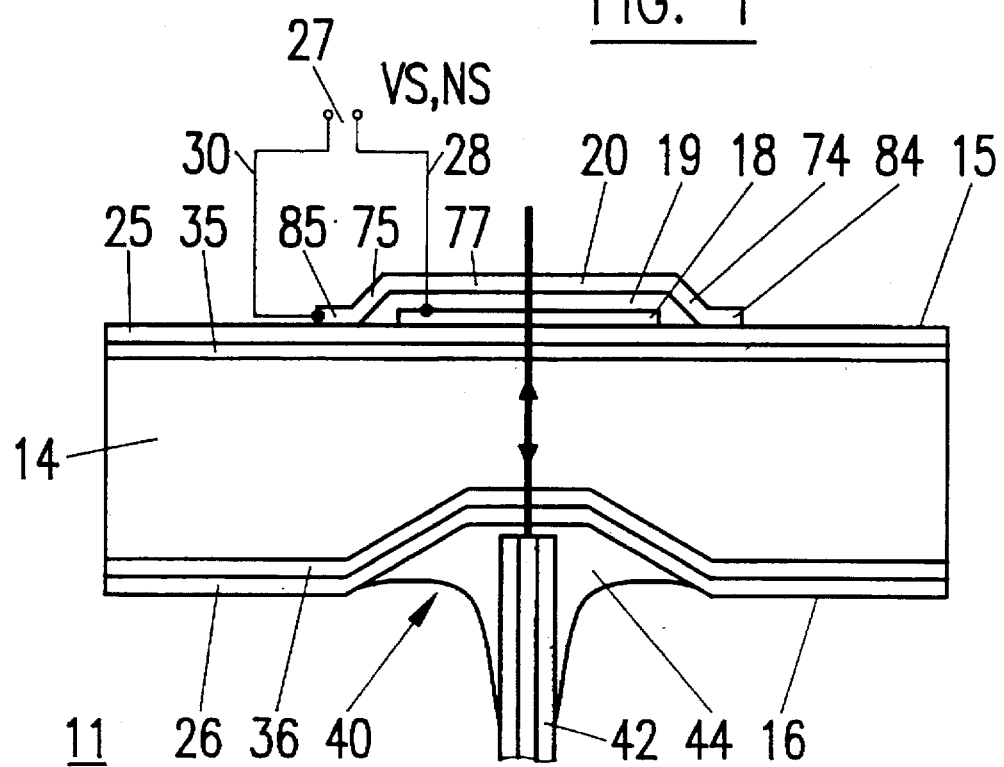
FIG. 1 shows a longitudinal cross-section of a reflection modulator (schematically and very much enlarged)

FIG. 1 shows a longitudinal cross-section of a reflection modulator 11. Here, compared to reality, the representation is very strongly enlarged and schematical. In particular, the longitudinal dimensions are not true to scale. As usual in semiconductor technology, the real dimensions are in the micrometer range.

Reflection modulator 11 comprises a base block 14 of monocrystalline silicon having two essentially parallel main surfaces 15, 16. These main surfaces carry protective and stabilizing coatings, e.g. two of them, which prevent corrosion of base block 14, amongst other things. These coatings may consist e.g. of an outer layer of Si3N4 (layers 25, 26) and an inner layer of Si02 (layers 35, 36). Another, desired property of these layers is that of modifying the reflective properties of the base block 14. This will be explained in more detail below.

Reflection modulator 11 further comprises a Fabry and Perot interferometer. It is formed by two reflecting layers 18, 20 between which an air gap 19 is provided. Reflecting layer 18 is fixed to the outer coating 25 of main surface 15. The second reflecting layer 20 is formed like a bridge having two lateral, ramp-shaped supports 74, 75 between which the actual reflecting layer 20 is extended in the shape of a substantially plane membrane 77. Supports 74, 75 are fixed to main surface 15 on either side of reflecting layer 18 by means of flat bottom portions 84, 85. In cross-section, this structure shows the illustrated trapezoid shape. The structure is open to the front and the back side. Membrane 77 is capable of oscillating and is extended substantially parallel to the first reflecting layer 18.

The two reflecting layers 18, 20 can be produced in a basically known manner by etching away from the sides an intermediate or sacrificial layer disposed between layers 18, 20. In practice, polysilicon shall be mentioned as a suitable material for the reflecting layers 18, 20, and a silicon oxide as a material for the sacrificial layer.

The mentioned polysilicon is electrically conductive. In contrast the materials Si3N4 and Si02 of coatings 25, 26 resp. 35, 36 are not conductive. Since the two reflecting layers 18, 20 do not touch each other, they are electrically insulated from each other and form a kind of disk capacitor. Via electric contacts 28, 30, a variable control voltage is appliable to reflecting layers 18, 20, said voltage resulting in a corresponding force acting between reflecting layers 18, 20. This force in turn results in an excursion of the free reflecting layer 20 and thus in a variation of the height of air gap 19.

On its second main surface 16, base block 14 is provided with a recess 40, preferably in the shape of a truncated pyramid whose axis is approximately orthogonal to main surface 16 and whose base surface faces outwards. Recess 40 is easily obtainable by anisotropic etching of monocrystalline base block 14. Also, coatings 26, 36 may cover the surface of recess 40 as well. Recess 40 is relatively significant, and its depth may e.g. amount to 80% of the thickness of base block 14.

An optical fiber 42 is now fastened in recess 40, preferably a monomode fiber. The fastening is obtained by a cementing 44, the cement being a commercially available optical adhesive whose refractive index corresponds to that of the optical fiber as largely as possible. Said adhesive connects optical fiber 42 on a relatively large surface and predominantly transversally to its axis to the side walls of recess 40. It is necessary that cement is present between the front surface of fiber 42 and the bottom surface of recess 40 as well. Possibly remaining air in the form of a bubble or a gap is thus excluded. Such remaining air would otherwise lead to a very disturbing surge of the refractive index at the end of optical fiber 42.

The hitherto described assembly works as follows: A light beam having a given wavelength reaches modulator 11 via optical fiber 42. This light beam emerges from the front surface of fiber 42 orthogonally to the two main surfaces 15, 16. The beam penetrates the adhesive of cementing 44 and the coatings 26, 36 and enters into base block 14. It passes through base block 14 and finally reaches air gap 19 through coatings 35, 25 and stationary reflecting layer 18. The mutually parallel surfaces formed by the two reflecting layers 18, 20 reflect the light beam back and forth several times, resulting in the condition of a standing wave in gap 19. A part of the incoming light continuously leaves air gap 19 in the reverse direction and re-enters optical fiber 42. In contrary, another portion of the light leaves the air gap 19 in the forward direction, i.e. through movable reflecting layer 20.

Now, the condition of the standing wave and the proportion of the returning light can be influenced by applying an electric voltage signal to the two reflecting layers 18, 20 by means of a generator 27 and contacts 28, 30. This voltage or wanted signal NS varies the height of air gap 19 and thus modifies the optical conditions. If the values are not extreme, the mutual relationships are linear, which is important for a distortion-free operation. The reflective capacity of the structure may be varied between 0 and approximately 95% at the most.

For a perfect operation, it is now necessary that mainly the passage from optical fiber 42 to base block 14 be as free from any reflections as possible since the light reflected at the boundaries interferes with the light returning from air gap 19. This produces disturbing signals in the reverse direction which must be prevented. Thus, as every boundary tends to reflect light, all other boundaries of the arrangement through which the light beam must pass are critical. It is therefore important that these boundaries and the associated coatings and their thicknesses possess optimally adjusted properties in each case. For the sequence of coatings 26 and 36 and base block 14, this means that a minimum of light shall be reflected back. For the sequence of base block 14, the coatings 35, 25 and the layer 18, however, it means semipermeability for the incoming as well as the reflected light.

Furthermore, the material of base block 14 must not produce any dispersions and must be sufficiently permeable. Also, the rigid reflective layer 18 must be semipermeable, as mentioned above. In this context, semipermeable designates a permeability in the order of 60 to 70%. With the material monocrystalline silicon for base block 14, a suitable structure of layers 25, 35 and the material polysilicon for reflective layers 18, 20, these conditions are fulfilled quite well. Likewise, semipermeability of reflecting layer 20 can be achieved with polysilicon and a suitable membrane thickness.

The dimensions of reflecting layer 20 and its mechanical tension further determine the frequency range in operation. The higher the intended frequency of the wanted signal NS, the smaller the size of reflecting layer 20 and the higher the mechanical tension. Further, the thickness and the precise shape of the membrane have an influence, as well as other parameters, as the case may be. The mechanical tension is adjustable independently of the other parameters simply by applying an electric DC voltage or bias voltage which may be superimposed on the wanted signal NS. The mechanical tension may thus be used for a simple adaptation of the finished reflection modulator 11 to the respective conditions of operation or application by a corresponding adjustment of the electric bias voltage.

The described construction is very compact and thus basically stable mechanically. Reflection modulator 11 is relatively simple to produce by known means of the semiconductor technology and therefore economical in manufacture. In particular, it is possible to simultaneously manufacture a large number of identical reflection modulators 11 on a single silicon wafer in parallel. However, on account of the tiny dimensions of the reflection modulators 11, these are exposed, after the evaporation and etching procedures, to a high risk of being damaged in the course of their subsequent separation from the wafer and the following mounting procedures.

Figure 2:
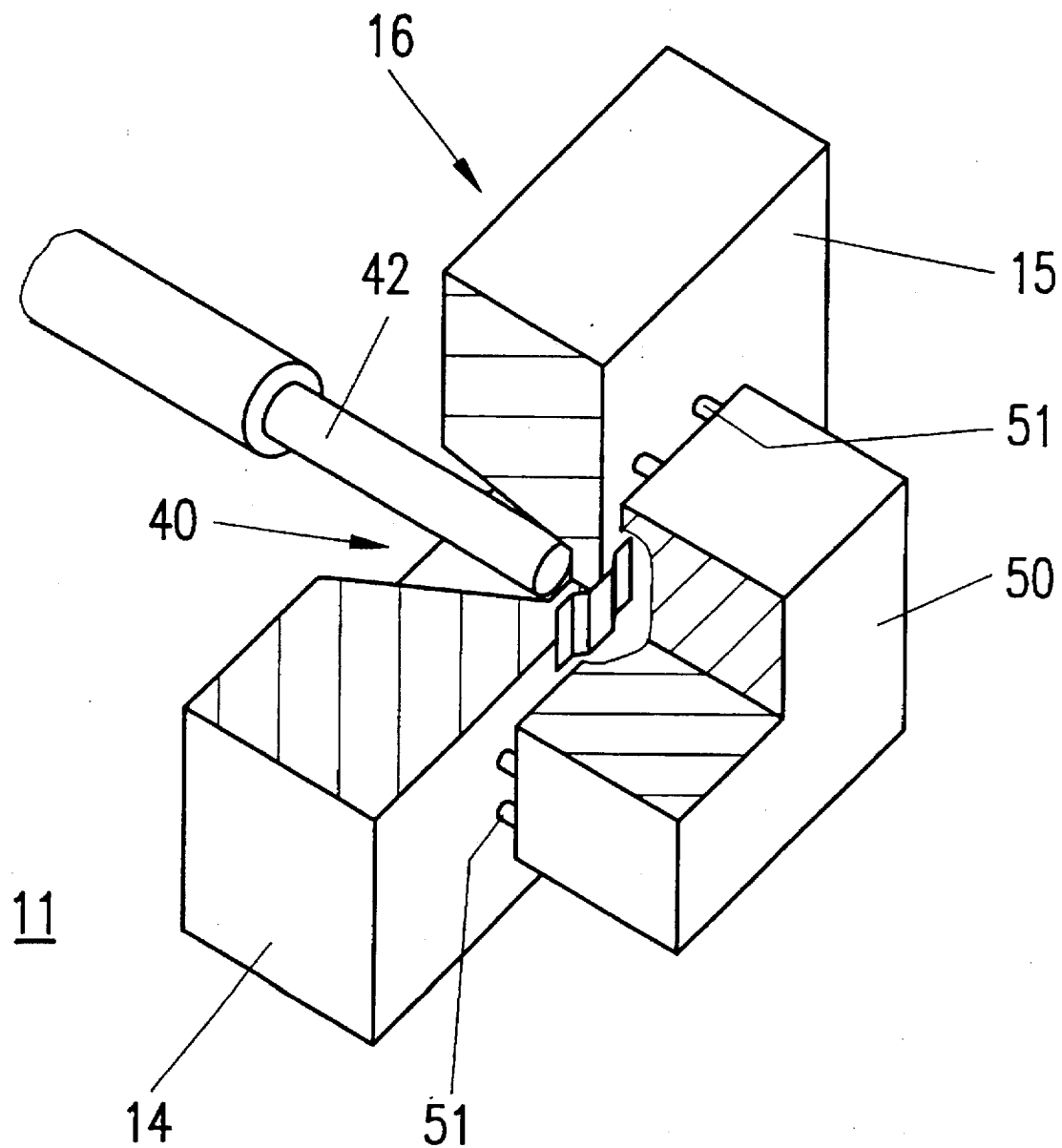
FIG. 2 shows a perspective view of the reflection modulator.

FIG. 2 shows a perspective view of reflection modulator 11 resulting in an essential improvement with respect to the above-mentioned manufacturing problem. Optical fiber 42 reaches base block 14 on the side of main surface 16 and is anchored in recess 40 in the form of a bare fiber with its protective sheathing removed. On the other main surface 15, a cover member e.g. of InGaAs is disposed which caps the sensitive membrane 20 on the outside and thus provides a massive protection from external influences. Said cover member 50 may e.g. rest on supporting elements 51, possibly in the form of a number of small bumps. Such bumps are easily produced on main surface 15 in the course of the described manufacturing steps of the actual reflection modulator according to FIG. 1 or subsequently. In another preferred embodiment, cover member 50 is supported on a closed, e.g. rectangular frame of metal or plastics material (e.g. polyimide). This offers the substantial advantage that a hermetically sealed incapsulation is produced which completely surrounds the Fabry and Perot modulator and thereby protects it from any external influences. This protection is mainly needed during manufacture when the reflection modulators 11 are detached, e.g. cut out from the wafer.

Another important point is that cover members 50 are mounted to said frames or to bumps 51 as long as the reflection modulators 11 are still united on the wafer. At this time of the manufacture, this mounting procedure is relatively easy to perform and can be substantially automated. The subsequent separation of the reflection modulators from the wafer is then relatively simple as well and may be made routinely.

Figure 3:
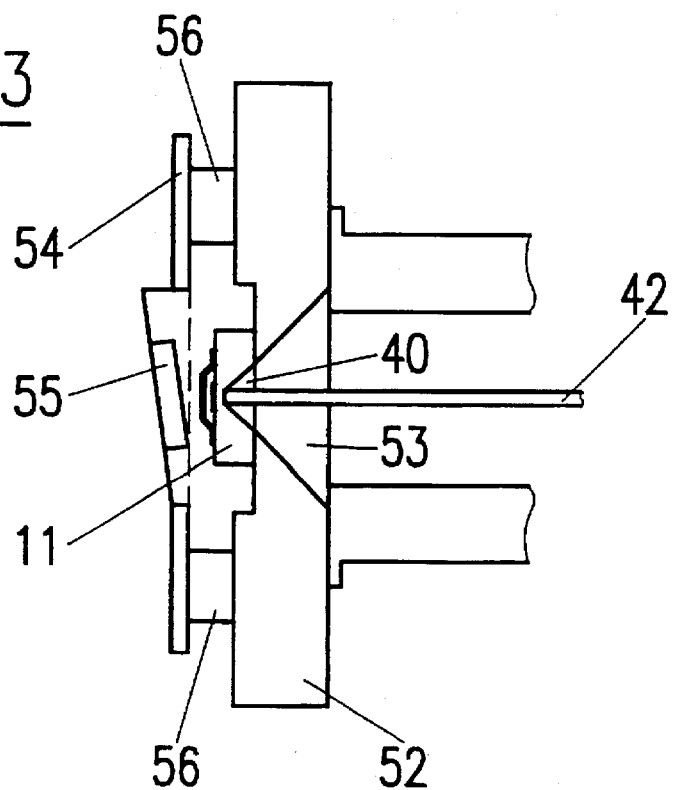
FIG. 3 shows an extended design of the reflection modulator.

FIG. 3 shows an extended, alternative construction of the reflection modulator 11 on a reduced scale. The light beam, which penetrates the oscillatory reflecting layer 20 and thus leaves air gap 19 resp. the Fabry and Perot system in the forward direction, can be further used. For this purpose, a photodiode 55 receiving said light beam is mounted on a support plate 54 on the side of modulator 11. Photodiode 55 should reflect a minimum of light back into air gap 19 in order not to produce any disturbances in the Fabry and Perot resonator. Photodiode 55 is therefore reflection-reduced by usual means and/or its external surfaces are inclined with respect to the optical axis. Mounting plate 54 itself is maintained by a supporting ring 56 which rests on main surface 15 of base block 14. Polyimide is a possible material for supporting ring 56, for example.

In this arrangement, support plate 54 and supporting ring 56 constitute an alternative for cover member 50 resp. the mentioned rectangular frame or the numerous bumps 51. In a preferred embodiment, support plate 54 is identical to cover member 50 of InGaAs semiconductor material, and photodiode 55 is integrated in the latter as a non-individual element.

The combination of reflection modulator 11 and photodiode 55 decisively extends the possible applications of the arrangement. Thus, a wide-band signal such as a video signal can permanently be received by means of photodiode 55, as well as possibly a superimposed arriving data signal. Simultaneously, a returning data signal can be transmitted by reflection modulator 11, so that in addition to an incoming wide-band distribution signal such as a plurality of video signals, one or more duplex data connections may be installed. In other words, so-called bidirectional services can be installed using a single fiber 42.

FIG. 3 further shows that modulator 11 is mounted on a support plate 52 having a conical bore 53 in such a manner that bore 53 and recess 40 together form a single cavity. Optical fiber 42 is axially introduced in recess 40 and bore 53 and cemented to the associated surfaces on a relatively large surface.

Figure 4:
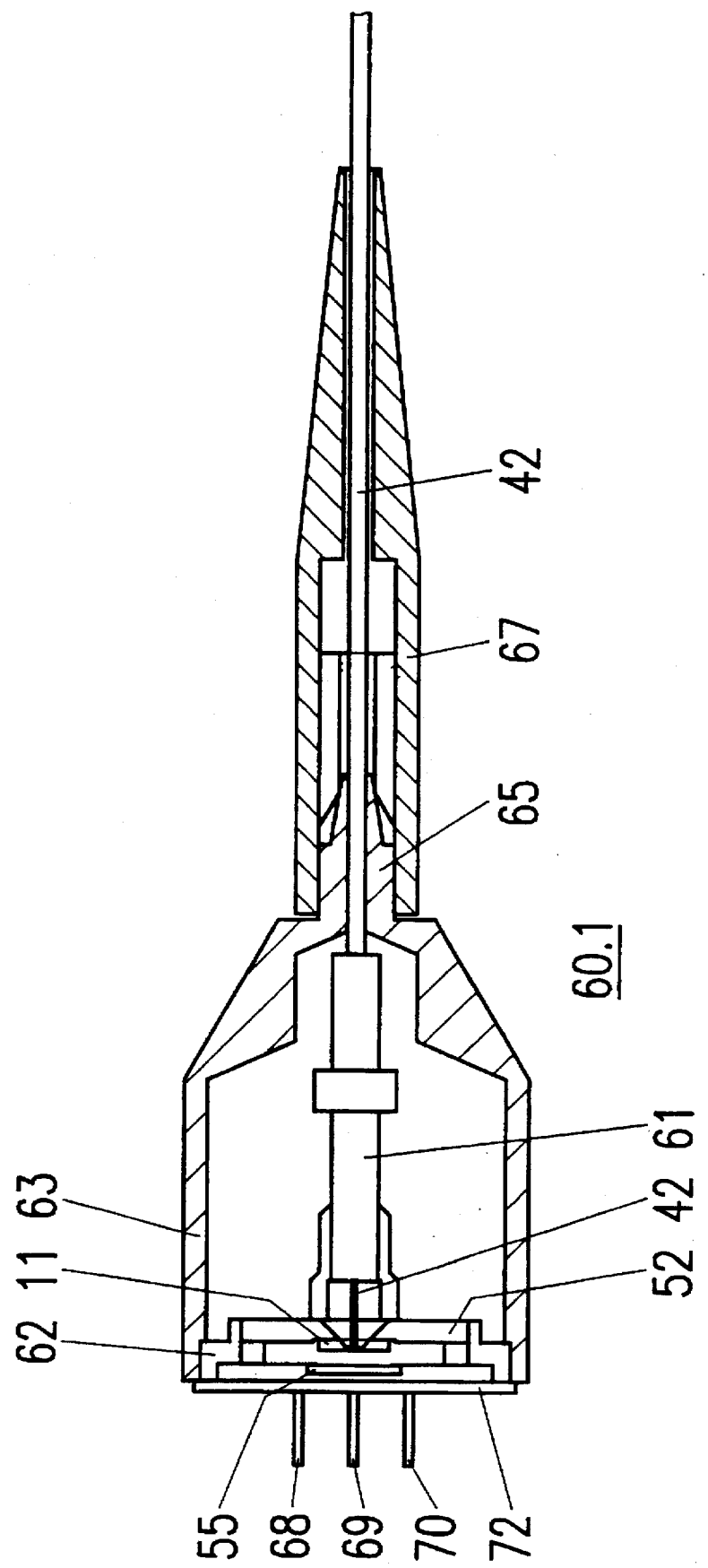
FIG. 4 shows a mechanical mounting for the reflection modulator.

FIG. 4 shows a first mechanical mounting 60.1 for reflection modulator 11 including photodiode 55 on a further reduced scale. Mounting plate 52 carries a sleeve 61 through which the optical fiber passes in the axial direction. These elements are accommodated in an outer sleeve 63 and connected to the latter by means of a flange portion 62. The end of outer sleeve 63 facing the fiber is provided with a slit, conical clamping portion 65 onto which a fiber guiding portion 67 is slipped or screwed. Under the pressure of guiding portion 67, clamping portion 65 clamps optical fiber 42 in such a manner that it is strain relieved inside outer sleeve 63. On the outside, fiber guiding portion 67 serves the purpose of preventing a sharp bending of fiber 42. Electric terminals 68 to 70, e.g. pins, are disposed on the front side 72 of mechanical mounting 60.1 in a plug-like manner. Up to sleeve 61, optical fiber 42 is protected from external influences by a protective sheathing. Between sleeve 61 and modulator 11, said protective sheathing is removed and fiber 42 is bared resp. free.

Mechanical mounting 60.1 forms an element which is easy to handle, similarly as an electric plug. Like a plug, it serves to protect the internal elements from dust, and also from water if the corresponding measures are taken. Mechanical mounting 60.1 thus allows a similar handling of reflection modulator 11 as is usual with present-day electronic equipment. The assembly is easy to handle by anyone and rugged and thus forms a terminal element for optical fiber lines also in the office area, i.e. for optical lines which are used in the so-called in-house area.

Figure 5A:
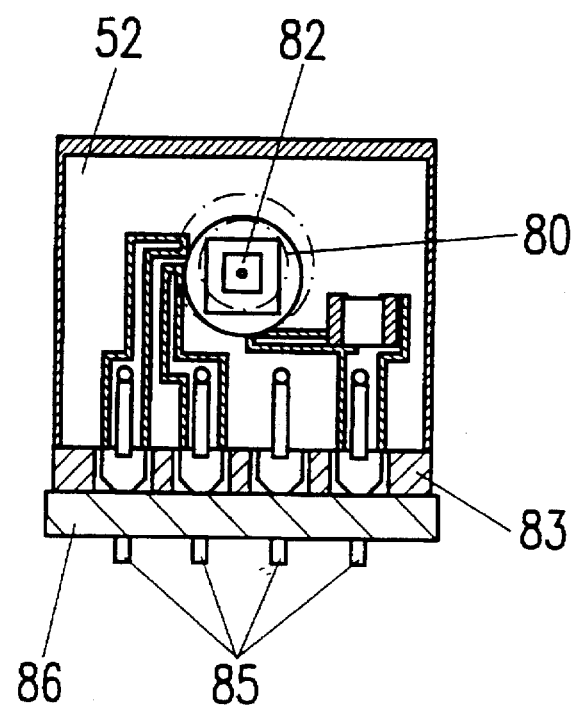
FIGS. 5A and 5B show an alternative mechanical mounting.
Figure 5B:
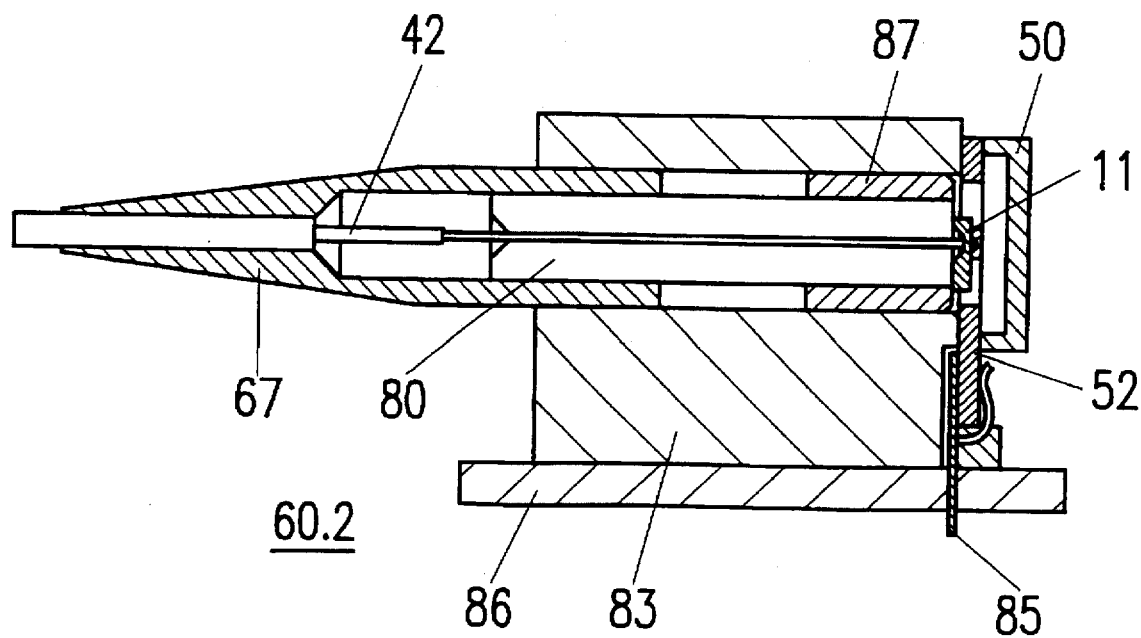

FIGS. 5A and 5B show a second mechanical mounting 60.2 for reflection modulator 11 on an even further reduced scale, the two views a and b being rotated 90° with respect to each other. In contrast to first mounting 60.1, second mounting 60.2 is designed to be fixedly mounted on a printed circuit board 86, optical fiber 42 being parallel to said circuit board 86. At the location of its entry into mounting 60.2, fiber 42 is seized by a sleeve-shaped fiber guiding portion 67 which prevents a sharp bending of fiber 42 and strain-relieves the contained fiber. The interior portion of fiber 42 does not have a fiber sheathing and is maintained by a tubular ferrule 80 e.g. of zircon or glass. Reflection modulator 11 abuts to one of the front sides of ferrule 80 in such a manner that recess 40 is centrally aligned in the direction of ferrule 80 and connected to the end of fiber 42. On the outside, the sensitive part of modulator 11 is covered by a cover portion 50 as described.

On one side, ferrule 80 carries a ring 87 e.g. of zircon which is supported in a retaining block 83. On its other side, said fiber guiding portion 67 is plugged onto ferrule 80. Retaining block 83 itself is attached to circuit board 86, contact pins 85 establishing the electric connections between support plate 52 or base block 14 of reflection modulator 11 and the conductors of circuit board 86.

The assembly described by way of examples with reference to FIGS. 1 to 5 allows for a number of alternatives which are all comprised within a common inventive idea. Some of these alternatives shall be explicited herebelow.

The mentioned materials, more particularly the materials of coatings 25, 26, 35, 36 of base block 14 and those of reflecting layers 18, 20 as well as the sacrificial layer between them may vary and can be selected according to practical considerations. The same applies to the dimensions of all referenced elements and parts.

Main surfaces 15 and 16 of base block 14 are preferably parallel. This automatically results from the disk-shaped structure of the silicon wafer which is used for the manufacture of base block 14. Basically, however, the parallelity is not necessary.

Optical fiber 42 may basically enter into base block 14 from both sides. However, the assembly described with reference to FIGS. 1 to 4 has the essential advantage that the connection of optical fiber 42 to the Fabry and Perot resonator resp. to air gap 19 produces substantially lesser dispersions and reflections of the light than if optical fiber 42 enters on the side of main surface 15. In this context, the adhesive layer of cement 44 between the front side of optical fiber 42 and coating 26 is decisive, as well as an appropriate selection of the sequence of layers 26, 36. If the dimensions are correct, a sufficiently uniform optical junction without substantial surges of the refractive index is obtained. A corresponding situation is fundamentally impossible if optical fibre 42 enters from the other side because of the oscillatory capacity of reflecting layer 20.

Cementing 44 is not bound to the existence of recess 40 and/or to its design, in particular not to the actual shape of the recess. However, in addition to the described advantages, recess 40 offers the further advantage that it has an adjusting effect in the mounting of fiber 42 and allows a very solid connection between base block 14 and fiber 42 on account of the relatively large cementing surface, which is very important in the subsequent mounting operations.

Reflection modulator 11 may be manufactured resp. operated with or without photodiode 55.

Photodiode 55 may be mounted on a support plate 54 as an individual element. However, photodiode 55 can be designed as an integral part of cover member 50, i.e. integrated into said member (as described) and form a so-called chip together with the latter. Then, the diode may be provided on the side of said chip facing the Fabry and Perot system or on the opposite side, which has consequences for the attachment of the electric terminals. If the diode is disposed on the side facing away from the Fabry and Perot system, its terminals can be contacted from the outside. However, in this case, the support material must be permeable to light, which it is sufficiently if InGaAs is used.

Photodiode 55 and its support, e.g. a support plate 54, may be spaced from base block 14 by a supporting ring 56, as described. The design, the material, the resting surface, the cement etc. of said supporting ring 56, of bumps 51, or of a supporting frame may be freely chosen. For practical reasons, it is important that the electric terminals 28, 30 are still freely accessible or attachable after having mounted supporting ring 56. This means that all electric connectors must be guided out e.g. onto coating 25 in an insulated condition.

The shape of the membrane-like reflecting layer 20 may be rectangular. However, other shapes which might have more favorable oscillatory properties under certain circumstances are possible. In particular, also the thickness of membrane 77 resp. of reflecting layer 20 may be suitably chosen, said thickness either being uniform or else irregular across the surface. For example, a restriction and/or a slight recess at the border between the actual oscillating surface and the ramp-shaped supports 74, 75 is advantageous since the oscillating surface is thereby functionally limited towards the outside.

The respective thicknesses of the inner coatings 35, 36 and the outer ones 25, 26 are preferably equal in pairs since these are simplest to manufacture in one manufacturing cycle each. However, these coatings may have different thicknesses, and/or the coating compositions and sequences may be different from the indicated materials SiO2 and Si3N4; likewise, there may be more than two layers. Furthermore, the coatings on the walls of recess 40 may be omitted. Important is the correct adjustment such that the reflection of the combination of coatings 26, 36 and of optical adhesive 44 is minimal, and that of the combination of coatings 35, 25 and of reflecting layer 18 is about 60%, which corresponds to the described semipermeability.

As semiconductor elements are concerned, reflection modulator 11 and photodiode 55 are manufactured according to basically known methods of the semiconductor technology. In other words, as mentioned, a plurality of identical modulator elements 11 are simultaneously manufactured on the base of a silicon wafer by several serial evaporating and etching processes. As soon as these modulator elements 11 are finished on the wafer, the supporting frames, bumps 51, or supporting rings 56 e.g. of polyimide are attached in one or several manufacturing cycles, and cover members 50 including photodiodes 55 integrated therein are mounted on them. The reflecting layers 20 are thereby protected, as described, from environmental influences, and mechanically. Subsequently, the electric terminals can be bonded at least partially as well before the modulator elements 11 are removed from the wafer along with the mounted diodes 55. The just mentioned operations are very advantageous, and they substantially enhance the other advantages of the described structure of the assembly.

We claim:

1. A reflection modulator (11) for a light beam emerging from an optical fiber (42) and re-entering the same, comprising:

a modulator unit based upon a Fabry and Perot interferometer and having two parallel reflecting layers (18, 20) one of which is mechanically displaceable by a wanted electric signal (NS), and a mechanical mounting which joins the optical fiber (42) and the modulator unit, wherein a base block (14) is provided having two main surfaces (15, 16), and wherein a first one (18) of said reflecting layers (18, 20) is positioned stationary on one (15) of said main surfaces (15, 16) and a second one (20) of said reflecting layers (18, 20) is arranged essentially parallel to said first one (18) of said reflecting layers and separated by an air gap (19).

2. The reflection modulator of claim 1, wherein said two reflecting layers (18, 20) are electrically conductive, electrically insulated from each other, and connected to electric contacts (28, 30).

3. The reflection modulator of claim 1, wherein a mechanical connecting unit is provided which joins said optical fiber (42) to said base block (14) transversally to one of said main surfaces (15, 16) and rigidly.

4. The reflection modulator of claim 3, wherein said two main surfaces (15, 16) are essentially parallel to each other, and wherein said optical fiber (42) is joined orthogonally to one of said main surfaces (15, 16).

5. The reflection modulator of claim 4, wherein said optical fiber (42) is connected to said base block (14) on the side of said second one (16) of said main surfaces (15, 16), and wherein said base block (14) is made of a material which is at least partially permeable to said light beam.

6. The reflection modulator of claim 3, wherein said connecting unit of said second main surface (16) comprises a recess (40) essentially having the shape of a truncated pyramid, which recess (40) is provided with said coatings (26, 36) and into which recess (40) said optical fiber (42) is cemented.

7. The reflection modulator of claim 6, wherein said optical fiber (42) is cemented in such a manner that an adhesive layer is present between its front surface and said coatings (26, 36).

8. The reflection modulator of claim 1, wherein said base block (14) consists of silicon, and wherein said main surfaces (15, 16) carry passivating coatings (25, 26, 35, 36).

9. The reflection modulator of claim 1, wherein said reflecting layers (18, 20) are made of polysilicon.

10. The reflection modulator of claim 1, wherein said second reflecting layer (20) is provided with a bridge-like structure having two ramp-shaped supports (74, 75) between which an essentially plane membrane (77) is extended, said supports (74, 75) resting on said first one (15) of said main surfaces on either side of said first reflecting layer (18).

11. The reflection modulator of claim 1, further comprising a photodiode (55) which is provided near the second reflecting layer (20) and is provided in the directional axis defined by said optical fiber (42).

12. The reflection modulator of claim 11, wherein said photodiode (55) is disposed on a cover member (50, 54) which is connected to said first main surface (15) by means of at least one supporting element (51, 56) in such a manner that both said reflecting layers (18, 20) are essentially completely incapsulated.

13. The reflection modulator of claim 12, wherein said photodiode (55) and said cover member (50) form a single, integrated unit.

14. The reflection modulator of claim 13, wherein said photodiode (55) is disposed on the side of said cover member (50) facing away from said second reflecting layer (20).

15. The reflection modulator of claim 11, wherein the free surfaces of said photodiode (55) are inclined with respect to said second reflecting layer (20).

16. The reflection modulator of claim 1, additionally comprising a mounting (60.1, 60.2), which mounting seizes said optical fiber, (42) in a strain-relieving manner, which mounting surrounds the modulator (11) completely and stabilizes it mechanically, and which mounting carries connecting elements (68, 69, 70, 85) for the electric contacting of the electrically conductive parts of said modulator (11).

17. The reflection modulator of claim 16, wherein said mounting (60.1) comprises a sleeve (63) which sleeve carries said base block (14) by means of a flange portion (62) and a support plate (52), and in which sleeve's axis said optical fiber (42) is mechanically maintained.

18. The reflection modulator of claim 17, wherein said sleeve (63) comprises a clamping portion (65) which clamping position cooperates with a fiber guiding portion (67) to clamp said optical fiber (42) in a strain-relieving manner, and wherein said sleeve (63) holds a front plate (72) in which plate electric terminals (68, 69, 70) are disposed for the purpose of contacting the internal components of the assembly.

19. The reflection modulator of claim 16, wherein said mounting (60.2) comprises a retaining block (83) which supports a ferrule (80), said optical fiber passing axially through said ferrule (80), the base block (14) being disposed at one end surface of said ferrule (80), and said connecting elements (85) being disposed transversally to said ferrule (80) and being designed for connection to a printed circuit board (86).

20. A method for the manufacture of a reflection modulator (11) for a light beam emerging from an optical fiber (42) and re-entering the same, said reflection modulator (11) comprising a base block (14) initially forming a part of a silicon wafer, said method comprising:

first, altering said silicon wafer by evaporating and etching procedures in such manner as to form on said base block (14) two reflecting layers (18, 20) with an air gap (19) between them, a recess (40), coasting 25, 26, 35, 36) and at least one supporting element (51, 56);

second, affixing a cover member (50) to said at least one supporting element (51, 56) on said base block (14) for mechanically protecting at least said two reflecting layers (18, 20) and said air gap; and third, subsequently detaching said base block (14) from said silicon wafer.

* * * * *